US011237892B1

(12) United States Patent
Kedlaya et al.

(10) Patent No.: US 11,237,892 B1
(45) Date of Patent: Feb. 1, 2022

(54) OBTAINING DATA FOR FAULT IDENTIFICATION

(71) Applicant: Hewlett Packard Enterprise Development LP, Houston, TX (US)

(72) Inventors: Naveena Kedlaya, Karnataka (IN); Tushar Bajpai, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/233,801

(22) Filed: Apr. 19, 2021

(51) Int. Cl.
*G06F 11/00* (2006.01)
*G06F 11/07* (2006.01)
*G06F 11/34* (2006.01)
*G06F 11/30* (2006.01)

(52) U.S. Cl.
CPC ...... *G06F 11/0751* (2013.01); *G06F 11/0769* (2013.01); *G06F 11/0775* (2013.01); *G06F 11/0778* (2013.01); *G06F 11/0781* (2013.01); *G06F 11/3051* (2013.01); *G06F 11/3433* (2013.01); *G06F 11/3476* (2013.01)

(58) Field of Classification Search
CPC ............. G06F 11/0751; G06F 11/0769; G06F 11/0775; G06F 11/3051; G06F 11/3433; G06F 11/3476; G06F 11/0757; G06F 11/0766; G06F 11/0772; G06F 11/0778; G06F 11/0781; G06F 11/0784; G06F 11/0787; G06F 11/3003; G06F 11/3006; G06F 11/3048
See application file for complete search history.

(56) References Cited

U.S. PATENT DOCUMENTS

| 7,797,572 | B2 * | 9/2010 | Kawashima | ........ G06F 11/2041 |
| | | | | 714/5.11 |
| 8,180,594 | B2 | 5/2012 | Stephan | |
| 8,732,530 | B2 | 5/2014 | Ng | |
| 8,949,671 | B2 | 2/2015 | Mukherjee | |
| 10,540,223 | B1 | 1/2020 | Johansson et al. | |
| 2005/0097405 | A1 * | 5/2005 | Sesek | .................. G06F 11/0733 |
| | | | | 714/48 |
| 2009/0077231 | A1 * | 3/2009 | Sakai | .................. G06F 11/0766 |
| | | | | 709/224 |
| 2020/0004620 | A1 * | 1/2020 | Suenaga | ............. G06F 11/0772 |

FOREIGN PATENT DOCUMENTS

| JP | 2003-045922 A | 2/2003 |
| JP | 4048736 B2 | 2/2008 |
| KR | 10-2008-0087571 A | 10/2008 |

OTHER PUBLICATIONS

Yuan et al., "Be Conservative: Enhancing Failure Diagnosis with Proactive Logging", 10th USENIX Symposium on Operating Systems Design and Implementation (OSDI '12), 2012, pp. 293-306.

* cited by examiner

Primary Examiner — Anthony J Amoroso
(74) Attorney, Agent, or Firm — Hewlett Packard Enterprise Patent Department

(57) ABSTRACT

Example techniques for obtaining data for identifying a fault are described. In response to receiving a fault message corresponding to a first device, a computing device determines a first set of data to be obtained for identifying the fault. The first set of data to be obtained is determined based on a workload of the computing device. The first set of data is then obtained.

20 Claims, 5 Drawing Sheets

OBTAINING DATA FOR FAULT IDENTIFICATION

BACKGROUND

A computing device may receive a fault message from another device. The device may be, for example, a server, a network switch, or a power distribution unit, which may distribute power to multiple devices. The fault message may indicate the presence of a fault in the device. For example, a fault message received from a server may indicate that a firmware deployment operation on the server has failed. To identify the fault in the device, data, such as logs, may be obtained and analyzed. The data may be obtained, for example, from the device or from a storage that stores data received from the device. The storage may be accessible to the computing device.

BRIEF DESCRIPTION OF DRAWINGS

The following detailed description references the figures, wherein.

DETAILED DESCRIPTION

Figure 1:
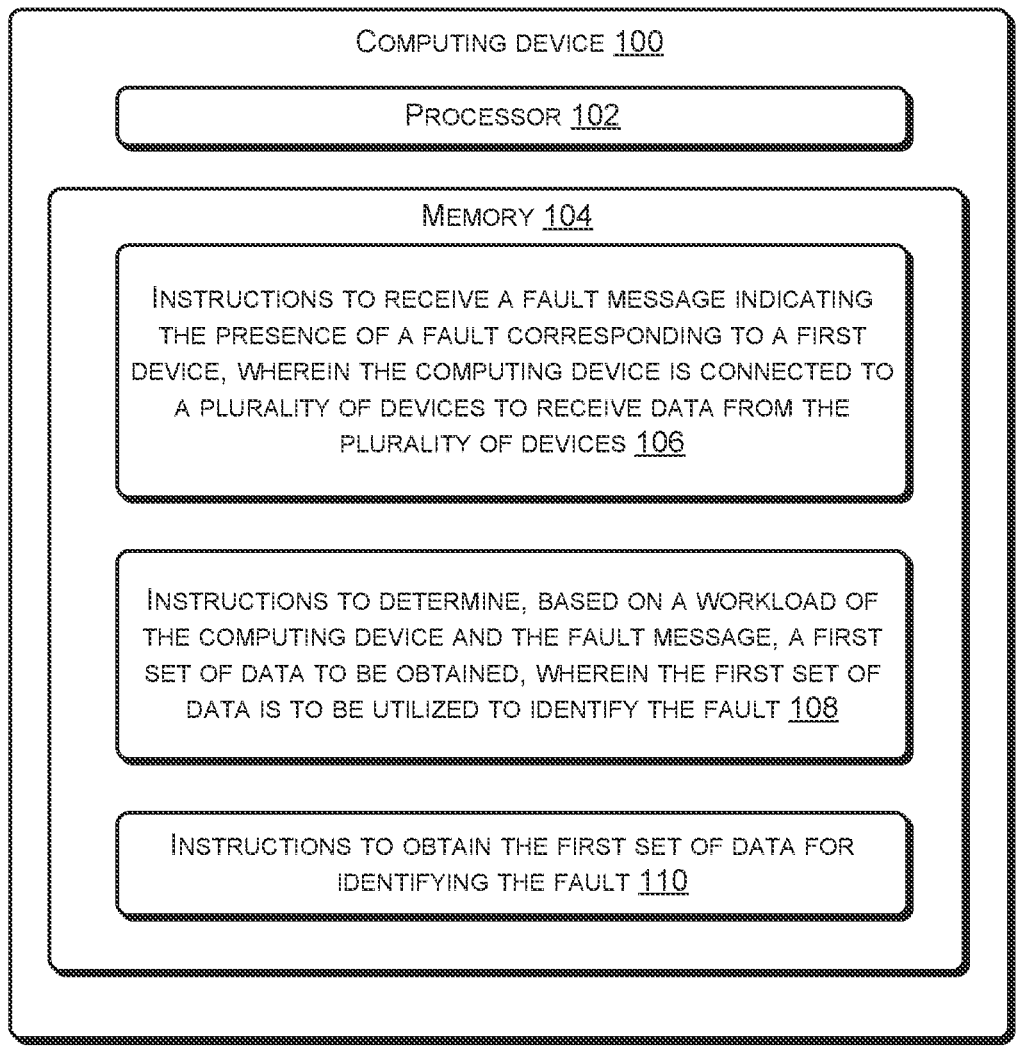
FIG. 1 illustrates a computing device for obtaining data for fault identification, according to an example implementation of the present subject matter.

A computing device may obtain data from a device or a storage that stores data received from the device for identifying a fault in the device. The obtained data may be analyzed, for example, by the computing device or service personnel for identifying the fault. The computing device may also be referred to as a management device. The device from which the fault message may be obtained may be, for example, a managed device on which the management device performs control functions, such as installing and updating firmware. In another example, the device from which the fault message may be obtained may be another management device that is in an active-standby relationship with the management device. For instance, the management device may assume the role of an active device and may perform the control functions in response to a failure of the other management device.

In some cases, the management device may not be aware of the particular data to be obtained for identifying the fault. As a result, the management device may request the device to provide a large amount of data or may retrieve a large amount of data from the storage, so that the data obtained is likely to include the data that will help identify the fault. Transfer of large amounts of data to the management device may increase resource consumption of the device. Also, a large amount of irrelevant data may have to be analyzed for fault identification. Further, obtaining the large amount of data from the managed device may increase resource consumption of the management device. For example, a large amount of network resources and processor resources may be consumed for collecting data from the managed devices. Similarly, fetching a large amount of data from a storage may also consume a large amount of processor, memory, and network resources.

The consumption of large amounts of resources for obtaining the data may cause reduced performance or may even lead to crashing of the management device, for example, when the resource consumption of the management device is already high. For instance, if data is obtained at a time when the management device is also installing security patches on several managed devices, the management device may crash. The reduced performance/crashing of the management device may delay or prevent the identification of the fault.

The present subject matter relates to fault identification and in particular to obtaining data for fault identification. With the implementations of the present subject matter, faults may be identified in a quick and an efficient manner.

In accordance with an example implementation, a computing device, also referred to as a management device, may receive a fault message. The fault message may indicate the presence of a fault corresponding to a first device. The first device may be, for example, a server, a network switch, or a power distribution unit (PDU). In an example, the fault message may indicate that the first device is unable to power on or that a firmware installation on the first device has failed. The fault message may be received from the first device.

A fault corresponding to the first device may refer to an underlying condition that may cause the first device to function in a manner different than an intended manner of functioning or may prevent functioning of the first device. For example, a fault may prevent the first device from powering on. The fault may exist in the first device or in another device connected to the first device. For instance, the first device may be unable to power on due to a damage to the power supply unit of the first device or due to a damage to a PDU that is to supply power to the first device.

In response to the fault message, the management device may determine a first set of data to be obtained for identifying the fault. The determination of the first set of data to be obtained may be based on the fault message. For example, if the fault message indicates a failure of firmware installation, the first set of data may include advanced health logs (which may indicate the health of the first device), network logs (which may indicate the various network-related events of the first device, such as loss of network connectivity), application logs (which are logs of an application on the management device that is responsible for installing the firmware on the first device), and device logs from the first device that relate to firmware installation. In an example, to determine the first set of data to be obtained based on the fault message, the management device may utilize a lookup table that indicates sets of data to be obtained for various fault messages.

The determination of the first set of data to be obtained may also be based on a workload of the management device—the management device may obtain a large amount of data when the workload of the management device is low and vice-versa. For instance, in the above example of failure of firmware installation, while the health logs, the device logs, the network logs, and the application logs may all be obtained in case of a low workload level of the management device, in case of a high workload level of the management device, the advanced health logs may not be obtained. This is because the advanced health logs may be large in size, and obtaining them may consume a large amount of network resources and time.

In an example, to allow determination of the first set of data based on the workload, the lookup table may also indicate the sets of data to be obtained for a particular fault message and for a particular workload level (e.g., high workload level, medium workload level, or low workload level). Further, in an example, a length of the time window for which data is to be obtained or the severity category of messages that are to be obtained may depend on the workload of the management device. For instance, while data generated in the past six hours may be obtained for a low workload level of the management device, data generated in the past one hour may be obtained for a high workload of the management device. Similarly, while error, warning, and information messages may be obtained for a low workload level, error messages alone may be obtained for a high workload level. Thus, for a particular fault message, the amount of data obtained may increase for a decreasing workload of the management device. Upon determination of the first set of data to be obtained, the first set of data is obtained.

In an example, the first set of data may include data to be obtained from the first device and/or from a second managed device that is connected to the first device. The device from which data is obtained may depend on the fault message. For instance, if the fault message indicates that the first device is unable to power on, data may be obtained from a PDU that supplies power to the first device.

The obtaining of data based on the workload of the management device prevents a reduced performance or a crashing of the management device. Thus, the obtaining of data becomes a more reliable process. Further, the determination of the data to be obtained based on the fault message ensures that relevant data is obtained. Thus, resource wastage that may otherwise be caused by obtaining irrelevant data is avoided. Further, obtaining data from devices that are connected to the managed device indicated by the fault message allows obtaining a holistic view regarding the fault and facilitates a quicker identification of the fault.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a computing device 100 for obtaining data for fault identification, according to an example implementation of the present subject matter. The computing device 100 may be implemented as, for example, a desktop computer, a laptop computer, a server, or the like. The computing device 100 includes a processor 102 and a memory 104 coupled to the processor 102.

The processor 102 may be implemented as a microprocessor, a microcomputer, a microcontroller, a digital signal processor, a central processing unit, a state machine, a logic circuitry, and/or any device that can manipulate signals based on operational instructions. Among other capabilities, the processor 102 may fetch and execute computer-readable instructions included in the memory 104. The computer-readable instructions may include instructions 106-110. The functions of the processor 102 may be provided through the use of dedicated hardware as well as hardware capable of executing machine-readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the management device 100 may also include interface(s) and system data. The interface(s) may include a variety of instructions-based interfaces and hardware interfaces that allow interaction with a user and with other communication and computing devices, such as network entities, web servers, and external repositories, and peripheral devices.

The computing device 100 may also be referred to as a management device 100 and may be connected to a plurality of devices (not shown in FIG. 1) to receive data from the plurality of devices. The plurality of devices may include managed devices. A managed device may be a device that is monitored by the management device and on which the management device performs control functions, such as installing or updating firmware. The managed devices may include, for example, a server, a network switch, a power distribution unit (PDU), and a server enclosure that may house a plurality of servers. The plurality of devices may also include another management device (not shown in FIG. 1) that may be in an active-standby relation with the management device 100. For instance, at a particular time, the other management device may be in an active state and may receive data from the managed devices and may perform control functions on the managed devices, while the management device 100 may remain in a standby state. Upon failure of the other management device, the management device 100 may become active and may start performing control functions on the managed devices.

In operation, the instructions 106 are executable to receive a fault message indicating the presence of a fault corresponding to a first device. For instance, the fault message may indicate that the first device has crashed, that the first device is unable to power on, that a firmware installation on the first device has failed, that a firmware update process on the first device has failed, or the like. The fault message may be received, for example, from the first device or another device connected to the first device. The first device may be, for example, a managed device or the other management device.

A fault corresponding to a device may refer to an underlying condition that may cause the device to function in a manner different than an intended manner of functioning or may prevent the functioning of the device. The fault may exist in the first device or in another device connected to the first device. For instance, the first device may be unable to power on due to a damage to the power supply unit of the first device or due to a damage to a PDU that is to supply power to the first device.

Upon receiving the fault message, a first set of data to be obtained for identifying the fault may be determined. The first set of data may include, for example, log data. The determination of the first set of data to be obtained may be based on the fault message. For example, if the fault message indicates a failure of firmware installation, the first set of data may include network logs of the first device and device logs from the first device that relate to firmware installation. The network logs may have to be obtained because they may indicate network-related events, such as a loss of network connectivity, that occurred while the firmware installation package was being transmitted to the first device. Thus, by analyzing the network logs, it may be determined whether the installation package that was used to install the firmware on the first device was incomplete or corrupt. The first set of data may also include application logs of an application of the management device 100 that is responsible for installing the firmware on the first device, as the application logs may indicate whether the fault is associated with the application. The application may also be responsible for performing other control functions on the first device. The first set of data may also include operating system (OS) logs, service logs, Hypertext Transfer Protocol daemon (HTTPD) logs, and audit logs of the management device 100, as these logs may indicate whether the firmware installation failed due to a fault on the management device 100. In an example, to determine the first set of data to be obtained based on the fault message, a lookup table may be utilized. The lookup table may indicate sets of data to be obtained for various fault messages.

The determination of the first set of data may also be based on a workload of the management device. For example, the management device 100 may obtain a large amount of data when the workload of the management device 100 is low and vice-versa. In an example, to allow determination of the first set of data based on the workload, the lookup table may also indicate the sets of data to be obtained for a particular fault message and for a particular workload level (e.g., high workload level, medium workload level, or low workload level).

The determination of the first set of data to be obtained may be performed when the instructions 108 are executed. Upon the determination, the first set of data is obtained. The first set of data may be obtained when the instructions 110 are executed. In an example, the first set of data may be obtained from the first device, a second device connected to the first device, or both. The second device may also be part of the plurality of devices. The first set of data may also include data, such as application logs and OS logs, stored in the management device 100. Accordingly, such data may be retrieved from the relevant location in a storage of the management device 100 in which the log messages generated in the management device 100 are stored. Further, in an example, at least a part of the first set of data that is to be collected from the managed device(s) may have already been sent by the managed device(s) and stored in a storage (not shown in FIG. 1) accessible to the management device 100. For instance, the information of utilization of hardware components, such as processor and memory, of the first device at the time of firmware installation may have already been stored in the storage. The storage accessible to the management device 100 may be the storage of the management device 100 or a storage connected to the management device 100. Such information may be retrieved from the storage to identify a fault that causes the firmware installation to fail. Accordingly, the obtaining of the first set of data may involve retrieving the data from the storage.

Figure 2:
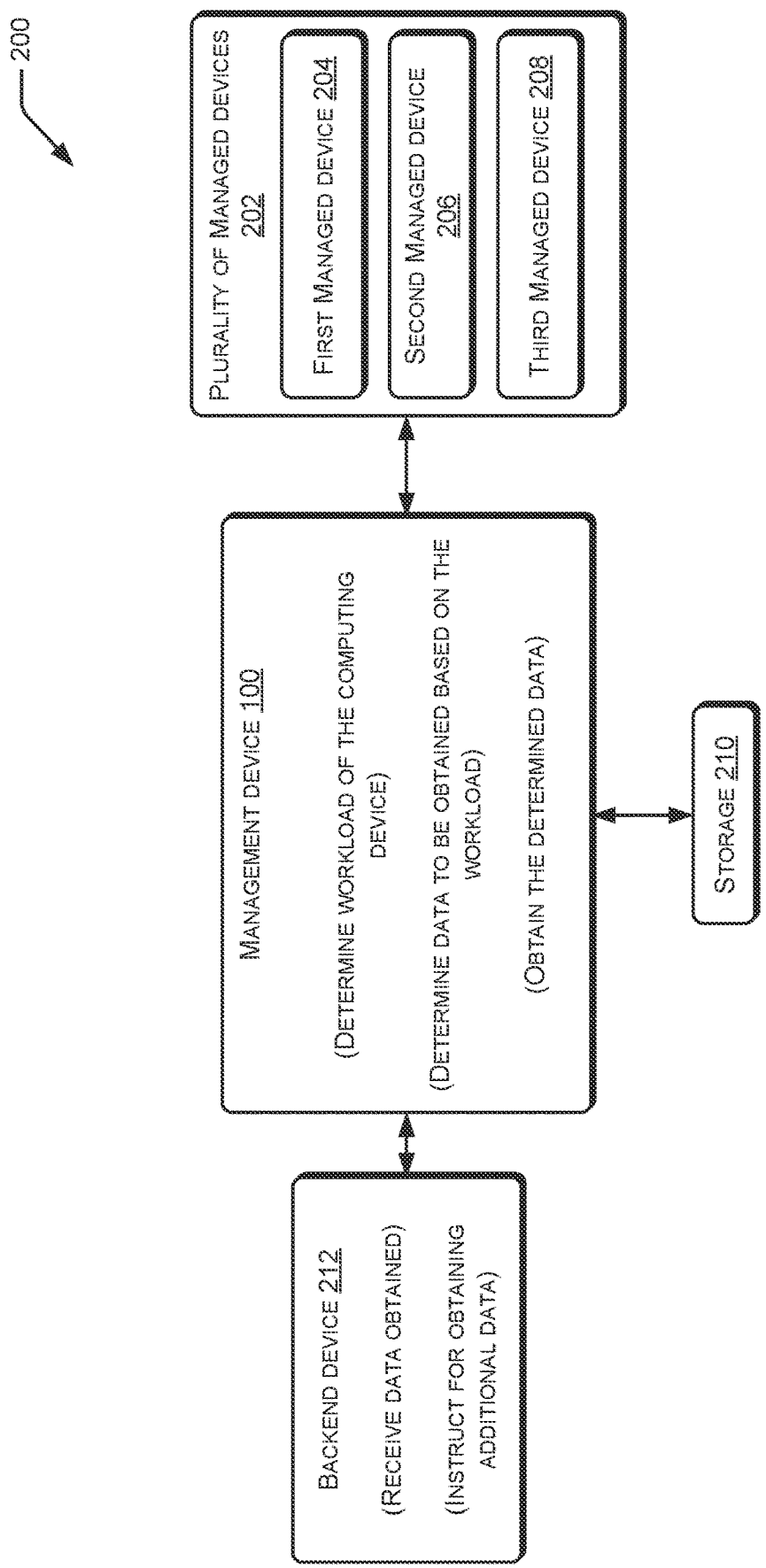
FIG. 2 illustrates a network environment implementing a management device to obtain data for fault identification, according to an example implementation of the present subject matter.

FIG. 2 illustrates a network environment 200 implementing the management device 100 that is to obtain data for fault identification, according to an example implementation of the present subject matter. The network environment 200 includes a plurality of managed devices 202 (hereinafter referred to as "managed devices 202"), which may include a first managed device 204, a second managed device 206, and a third managed device 208. While the various managed devices are shown as part of a single block (i.e., the block 202), in an example, the managed devices may be distributed across networks, geographies, or both. Further, the managed devices may or may not be connected to each other.

A managed device may be, for example, a server, a server enclosure, a disk, a network switch, a router, or a PDU. The server may be, for example, a blade server. The server enclosure may house a plurality of servers and may house equipment for powering the servers, equipment for cooling the servers, and equipment for providing network connectivity to the servers. The PDU may distribute power to a plurality of servers, such as servers housed in an enclosure. In an example, the PDU may be an intelligent PDU (iPDU), which, in addition to distributing power, can perform additional functions, such as metering functions, allowing remote turn-on of servers, monitoring temperature, humidity, and the like of the iPDU. In an example, the managed devices 202 may be part of a data center. Further, the management device 100 may also be deployed in the data center.

The managed devices 202 may be connected to the management device 100 for being monitored by the management device 100. For example, the management device 100 may monitor the functioning of a managed device and components that are part of the managed device and may also monitor parameters, such as temperature, humidity, and the like, of the managed device and its components. To perform the monitoring functions, the management device 100 may receive messages from the managed device indicating the functioning, workload, temperature, humidity, and the like of the managed device and its components. The management device 100 may also perform control functions on the managed devices 202. The control functions may include, for example, updating firmware installed (in case of a server, network switch, or an iPDU), setting bandwidth (in case of a network switch), setting power limit (in case of an iPDU or a server enclosure). In the case of a server, the control functions performed may also include deployment of a server profile (which captures aspects of a server configuration, such as BIOS settings, network connectivity settings, and boot order configuration) on the server and applying a security patch on the server.

The management device 100 may also check for the existence of a fault corresponding to a managed device. As explained earlier, a fault corresponding to a managed device may cause the managed device to perform in a manner different than an intended manner of functioning. In an example, the management device 100 may detect the existence of a fault corresponding to a managed device based on a message received from the managed device. For instance, the management device 100 may detect the existence of a fault upon receiving a message from the managed device indicating that an installation of a firmware update has failed. In another example, the management device 100 may detect the existence of a fault corresponding to a managed device based on a message received from another managed device. For instance, the management device 100 may detect the existence of a fault upon receiving a message from the second managed device 206 indicating that a communication with the first managed device 204 is lost. A message indicating the existence of a fault may also be referred to as a fault message.

As will be appreciated, a fault is to be identified and rectified so that the corresponding managed device may revert to a normal functioning state. To facilitate identification of the fault, the management device 100 may obtain data that would be helpful in identifying the fault. The data to be obtained may be referred to as a set of data. The set of data may be obtained, for example, from the managed device, a device connected to the managed device, the management device 100, or any combination thereof. For example, in case of a fault message indicating that the installation of a firmware update has failed in the first managed device 204, the data may be obtained from the first managed device 204 and the management device 100. In another example, in case of a fault message indicating that the communication with the first managed device 204 is lost or that the first managed device 204 is not turning on, data may be obtained from the server enclosure housing the first managed device 204, the PDU that supplies power to the first managed device 204, and the network switch connected to the first managed device 204. In a further example, in case of a fault message from a server enclosure indicating that power supply to a new server installed in the server enclosure is denied due to a power cap limit, data may be obtained from all devices that are housed in the server enclosure and from the server enclosure.

The set of data may also include data to be obtained from a storage 210 that is to store logs that were previously provided by the managed device(s) (e.g., to provide an update regarding the functioning of the managed device(s) to the management device 100). Although the storage 210 is shown as external to the management device 100, in an example, the storage 210 may be part of the management device 100.

The set of data to be obtained may depend on the fault message. For example, if the fault message indicates a failure of installation of a firmware update on the first managed device 204, the set of data to be obtained may include network logs from the first managed device 204, device logs from the first managed device 204 that relate to firmware update installation, application logs of an application of the management device 100 that is responsible for installation of a firmware update on the first managed device 204, OS logs of the management device 100, and audit logs of the management device 100. Similarly, if the fault message indicates a failure of deployment of a profile on the first managed device 204, the set of data to be obtained may include network logs from the first managed device 204, device logs from the first managed device 204 that relate to profile deployment, application logs of an application of the management device 100 that is responsible for deployment of the profile on the first managed device 204, OS logs of the management device 100, and audit logs of the management device 100. Further, if the fault message indicates that the first managed device 204 has failed to boot, the data to be obtained may include health logs corresponding to the first managed device 204, which may be obtained from a baseboard management controller (BMC) installed in the first managed device 204. The health logs may include, for example, processor utilization, memory utilization, and error messages generated in the past 24 hours in the first managed device 204.

In an example, to determine the set of data to be obtained based on the fault message, the management device 100 may utilize a lookup table (not shown in FIG. 2) that indicates the sets of data to be obtained corresponding to various fault messages. The lookup table may also indicate the devices from which the set of data is to be obtained. The lookup table may be stored in the management device 100. The lookup table may be created, for example, by a user of the management device 100 or may be supplied to the management device by the manufacturer of the managed devices 202. The lookup table may be updated by adding more fault messages and/or more data to be obtained. In an example, the updating may be performed by the user or by the manufacturer of the managed devices 202. In an example, the updating may be performed by the management device 100 based on a learning derived from previous fault identification processes.

In an example, the set of data to be obtained may be determined based on a workload of the management device 100, as obtaining data is a resource-intensive activity. The obtaining of data is resource-intensive because, as explained earlier, the obtaining may involve retrieving data from the storage 210 and may also involve collecting data from one or more managed devices Therefore, obtaining a large amount of data at a time when the management device 100 is already busy (e.g., because of deployment of server profiles on tens of servers) may be potentially harmful to the management device 100 (e.g., may cause crashing of the management device 100). To prevent a potentially harmful event occurring at the management device 100 due to obtaining of data, the amount of data that is obtained to identify a fault may be varied based on a workload of the management device 100. For example, for a particular fault, the amount of data obtained may be more for a scenario in which the workload of the management device 100 is low (e.g., a first workload) than for a scenario in which the workload of the management device 100 is high (e.g., a second workload). Thus, the set of data obtained when the workload of the management device 100 is low may include more information regarding the fault than the set of data obtained when the workload of the management device 100 is high.

In an example, to allow determination of the set of data based on the workload, the lookup table may also indicate the sets of data to be obtained for a particular fault message and for a particular workload level. For instance, for a given fault message, the lookup table may indicate the set of data to be obtained for a low workload level, the set of data to be obtained for a medium workload level, and the set of data to be obtained for a high workload level. In another example, to reduce the amount of data obtained for an increased workload of the management device 100, the management device 100 may determine a length of a time window in the past for which data is to be obtained based on the workload. Higher the workload, lower may be the length of the time window. For instance, when the workload of the management device 100 is low, the data generated in the past six hours may be obtained, and when the workload of the management device 100 is high, the data generated in the past one hour may be obtained. In a further example, to reduce the amount of data obtained for an increased workload of the management device 100, the severity category of messages to be obtained may be determined based on the workload. A severity category of a message may be, for example, an error category, a warning category, or an information category. A message of the error category has a higher severity than a message of the warning category and a message of the warning category has a higher severity than a message of the information category. The management device 100 may obtain messages of all severity categories in the case of low workload, and may obtain messages of error category alone in the case of a high workload. In some other examples, any of the aforesaid example techniques may be used for varying the data to be obtained depending on workloads of the management device 100. In accordance with the above examples, the set of data to be obtained for a high workload level may be a subset of the set of data to be obtained for a medium workload level, and the set of data to be obtained for a medium workload level may be a subset of the set of data to be obtained for a low workload level.

Upon determining the set of data to be obtained and the devices from which the data is to be obtained, the management device 100 may obtain the set of data. To obtain the set of data, the management device 100 may instruct the managed device(s) to provide the data (e.g., network logs and device logs), may retrieve the log data generated in the management device 100 (e.g., application logs and OS logs), or both. Further, as explained earlier, in some cases, at least some of the data to be obtained may have already been received and stored in the storage 210. In such cases, to obtain the data, the management device 100 may retrieve the data from the storage 210. In an example, the data may be stored in a database in the storage 210. Accordingly, to retrieve the relevant data, structured query language (SQL) queries may be utilized. The data retrieved may be exported to, for example, a comma separated value (CSV) file.

In an example, the obtained data may be analyzed by the management device 100 or by a user of the management device 100 for identification of the fault. Based on the analysis, the management device 100 or the user may perform remedial actions. In another example, the obtained data may be transmitted to a backend device 212 for identification of the fault. The backend device 212 may belong, for example, to the supplier of the managed devices 202. The analysis and the remedial actions may be carried out by the backend device 212 or by a user of the backend device 212, such as a support technician of the supplier of the managed devices 202. Before transmission to the backend device 212, the obtained data may be compressed, encrypted, or both.

In some cases, the set of data obtained may not be sufficient to identify the fault. This may be, for example, because the data was obtained when the workload of the management device 100 was high, and therefore, the set of data did not have all the data to be analyzed for the fault identification. In such a case, an additional set of data may be obtained by the management device 100. To distinguish between the set of data obtained initially and the set of data obtained subsequently, the set of data obtained initially may be referred to as a first set of data and the set of data obtained subsequently may be referred to as a second set of data. In an example, the determination that the first set of data is insufficient to identify the fault may be performed by a user/device that analyzed the first set of data. For instance, the determination may be performed by a user of the backend device 212. Upon the determination, the backend device 212 may indicate to the management device 100 that the first set of data is insufficient to identify the fault. In response to the indication, the management device 100 may determine the second set of data to be obtained and may accordingly obtain the second set of data. Similar to the determination of the first set of data, the determination of the second set of data may also be performed based on the fault message and the workload of the management device 100 at the time of the obtaining the second set of data. The second set of data may not include the data that was part of the first set of data, thereby preventing repeatedly obtaining the same data. For instance, the first set of data may include the logs generated by the management device 100 and the data retrieved from the storage 210, and in response to the indication, the management device 100 may collect data from the managed device(s).

In an example, in addition to the indication regarding sufficiency of the first set of data for analysis, the backend device 212 may also provide a data specification that specifies the additional data to be obtained. The additional data to be obtained may be determined based on an analysis of the first set of data. Thus, the second set of data obtained may include the data specified in the data specification. In an example, if the data specification is provided, the management device 100 may not consider the fault message to determine the second set of data. Instead, the second set of data may be determined based on the data specification alone. Thus, the data specification may override the determination of the set of data based on the fault message.

While obtaining a lesser amount of data during a high workload level of the management device 100 may delay the identification of the fault, this ensures that the management device 100 remains operational. Further, the first set of data obtained may serve as a starting point for identification of the fault and may provide an idea about the additional data to be obtained, thereby allowing to obtain more relevant data and increasing the likelihood of fault identification based on the second set of data. Thus, the obtaining of data according to the present subject matter balances the workload of the management device 100 and the speed of identification of the fault.

In an example, the workload of the management device 100 is determined based on workloads of hardware components (e.g., the processor 102 and the memory 104), database Input/Output (I/O) activity, and network I/O activity of the management device 100. The database I/O activity may be caused by retrieving data from the database in the storage 210 and the network I/O activity may be caused by collecting data from the managed device(s). In an example, the determination of workload may involve determination of an expected workload of the management device 100 at the time of obtaining data. The expected workload may be determined based on pending tasks that are to be carried out by the management device 100. A pending task may pertain to a managed device. For instance, a pending task may be a task to deploy a server profile on a server, a task to update firmware on a server, a task to verify health of a managed device, or the like. The execution of a pending task may cause consumption of resources of the management device 100. The expected workload may be determined based on the pending tasks because the pending tasks provide an idea of the amount of resources of the management device 100 that would be consumed for execution of the pending tasks. For instance, the presence of a large number of resource-intensive pending tasks may indicate that the workload of the management device 100 is expected to be high. In an example, the management device 100 may determine the expected workload based on an estimated resource consumption of each pending task. The resource consumption of each task may be stored in the management device 100 to facilitate determination of the expected workload. The determination of the expected workload ensures that the management device 100 does not get overloaded while obtaining data. For instance, a scenario in which a large amount of data is obtained while several resource-intensive pending tasks are being executed is prevented.

In an example, the management device 100 may determine the workload based on the workloads of hardware components and also the expected workload. For instance, a weighted sum of the workloads of hardware components and the expected workload may be used to determine the workload. In an example, the workload may be categorized into a high level, medium level, and a low level for determining the set of data to be obtained. For instance, if the weighted sum is in a first range, the workload may be said to be low, and if the weighted sum is in a second range and in a third range, the workload may be said to be medium and high respectively. In other examples, the workload may be categorized into less or more number of categories (e.g., very low, low, medium, high, and very high).

In an example, when the workload of the management device 100 is less than a threshold workload, such as when the workload is at a low level, the management device 100 may collect inventory data from the managed devices 202. The inventory data may include details of applications, firmware, hardware, OS, and the like that are part of a managed device, such as firmware version, OS version, size of disk, size of memory, validity of license of an application. The inventory data may be helpful to identify the fault or predict a fault corresponding to a managed device. For example, the firmware version may be useful to detect an incompatibility between a hardware device and its corresponding firmware. Further, the validity of a license of an application may indicate that the license of the application is to be renewed. The inventory data may be obtained when the workload of the management device 100 is low because the inventory data may not change frequently, and therefore may not have to be frequently obtained and checked. Thus, the inventory data collection is performed in a manner that will not overload the management device 100.

Although not shown, the various components of the network environment 200 may communicate with each other over a communication network, which may be a wireless or a wired network, or a combination thereof. The communication network may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network may include various network entities, such as transceivers, gateways, and routers.

In an example, in addition to the lookup table, a topology graph may be utilized to determine the devices from which data is to be collected in response to a fault message.

Figure 3:
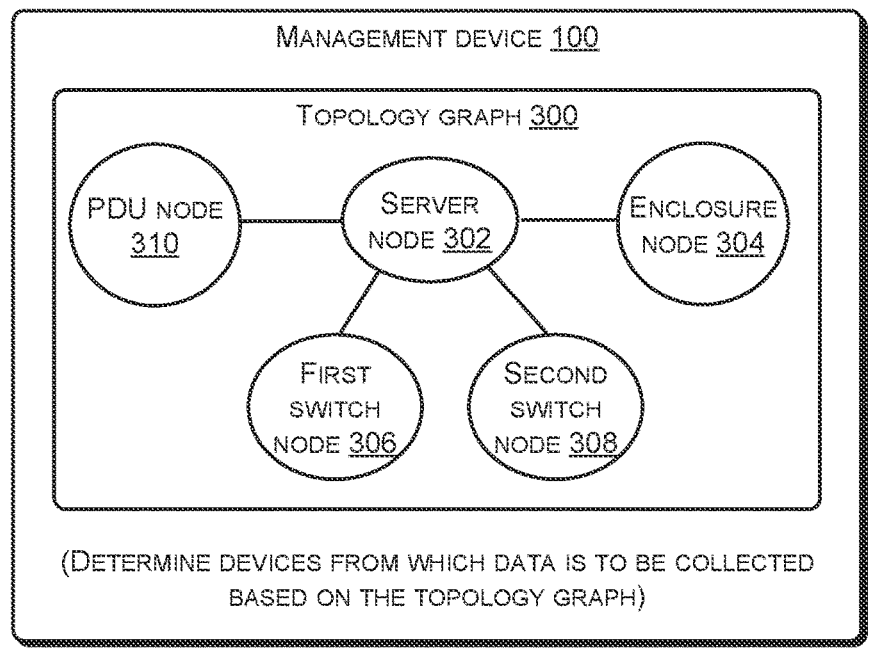
FIG. 3 illustrates a management device having a topology graph, according to an example implementation of the present subject matter.

FIG. 3 illustrates the management device 100 having a topology graph 300, according to an example implementation of the present subject matter. The nodes of the topology graph 300 may indicate managed devices, such as devices in a data center, and the edges of the topology graph 300 may indicate the connections between the managed devices. For instance, a server node 302 indicates a server and an enclosure node 304 connected to the server node 302 indicates an enclosure in which the server is housed. The server and the enclosure may correspond to the first managed device 204 and the second managed device 206 respectively. A first switch node 306 and a second switch node 308 connected to the server node 302 indicate a first network switch and a second network switch, respectively, that are connected to the server. Further, a PDU node 310 connected to the server node 302 indicates a PDU that supplies power to the server. A node may also indicate other details regarding the corresponding managed device, such as the internet protocol (IP) address of the managed device.

The topology graph 300 may be used in addition to the lookup table to determine the devices from which data collection is to be performed in response to a fault message. For instance, the lookup table may specify that, for a particular fault message from a server, data is to be collected from the enclosure in which the server is housed, the PDU that supplies power to the server, and the network switches that are connected to the server. Accordingly, in response to receiving the fault message from the server that corresponds to the server node 302, the management device 100 may identify the particular enclosure, the network switches, and the PDU from which the data is to be collected based on the topology graph 300. Further, the management device 100 may communicate with the enclosure, the switches, and the PDU at the IP addresses specified in the topology graph 300 and may instruct them to provide the data.

The utilization of the topology graphs provides an efficient manner of identifying the devices from which data is to be collected. In an example, data may be obtained in response to failure of a management device, as will be explained below.

Figure 4:
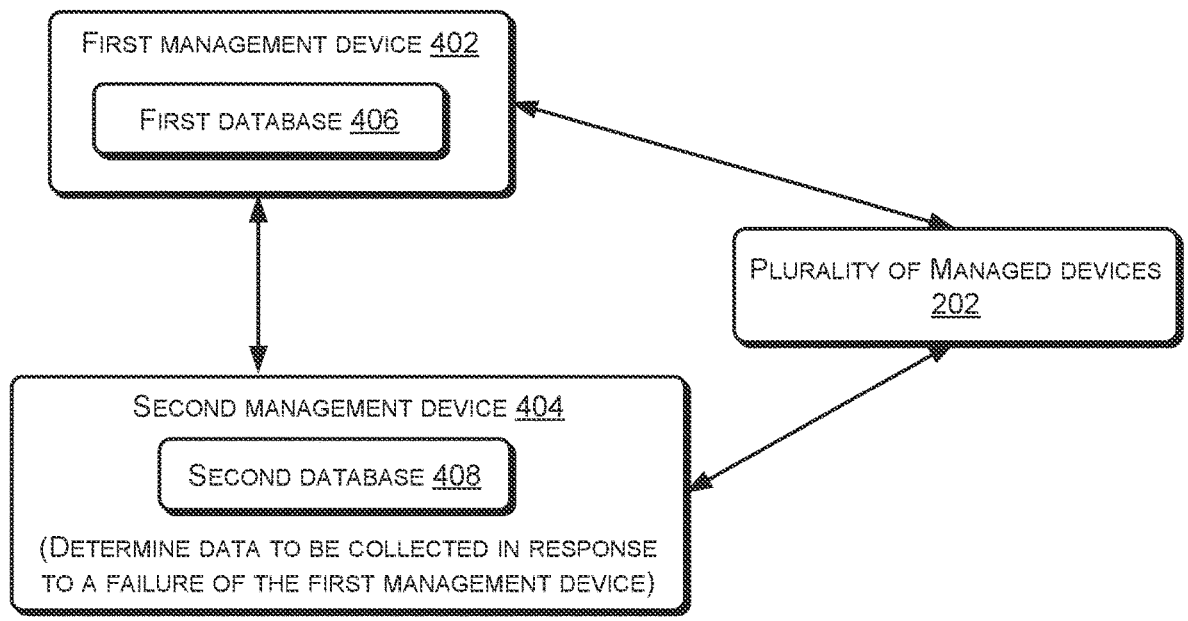
FIG. 4 illustrates a network environment having a first management device and a second management device that are in an active-standby relation and that manage a plurality of managed devices, according to an example implementation of the present subject matter.

FIG. 4 illustrates a network environment 400 having a first management device 402 and a second management device 404 that are in an active-standby relation and that manage the plurality of managed devices 202, according to an example implementation of the present subject matter. Initially, the first management device 402 may be in an active state and the second management device 404 may be in a standby state. Accordingly, the first management device 402 may receive messages from the managed devices 202, perform control functions on the managed devices 202, and may obtain data in response to a fault message corresponding to a managed device, as explained above. The second management device 404, which is in the standby state, may not perform the control functions and may not obtain the data in response to a fault message.

When the first management device 402 fails, such as crashes, the second management device 404 detects the failure, such as based on non-receipt of a heartbeat message from the first management device 402 or based on receipt of an alert message. Further, the second management device 404 assumes an active state and performs the control functions and obtains data in response to the fault message. In this manner, it is ensured that the performance of the control functions and the obtaining of data continues even if one management device fails.

In an example, prior to failure of the first management device 402, the messages, such as log messages, received from the managed devices 202 may be stored in a first database 406 of the first management device 402. Further, the messages may be received by the second management device 404 as well, and may be stored in a second database 408 of the second management device 404. Accordingly, the second database 408 may be similar to the first database 406. In another example, a single copy of the database having the messages received from the managed devices 202 may be stored in a common database (not shown in FIG. 4) that is accessible to both the first management device 402 and the second management device 404.

In an example, the first database 406 or the common database may store messages, such as log messages, generated by the first management device 402 that provide indications regarding the functioning of the first management device 402. The messages may include, for example, system log (syslog) messages and hypertext transfer protocol daemon (HTTPD) log messages. Similarly, the second database 408 or the common database may store messages generated by the second management device 404 that provide indications regarding the functioning of the second management device 404. Further, the first database 406 and the second database 408 may be periodically synchronized. Thus, regardless of whether the first database 406 and the second database 408 are used or whether the common database is used, the messages indicating functioning of both the first management device 402 and the second management device 404 are available to both the management devices.

To determine the cause of failure of the first management device 402, the second management device 404 may obtain data. The data may be obtained from the second database 408 or the common database. The data obtained may include the messages indicating the functioning of the first management device 404 that were generated prior to the failure of the first management device 404. Such messages may provide an idea as to the reason of failure of the first management device 404.

The data to be obtained may be determined using a lookup table. Similarly, the amount of data to be obtained may depend on the workload of the second management device 404, as explained above. For example, messages of a particular severity category, messages generated beyond a threshold period of time in the past, or messages of a particular type (e.g., health logs) may not be obtained if the workload of the second management device 404 is high.

Figure 5:
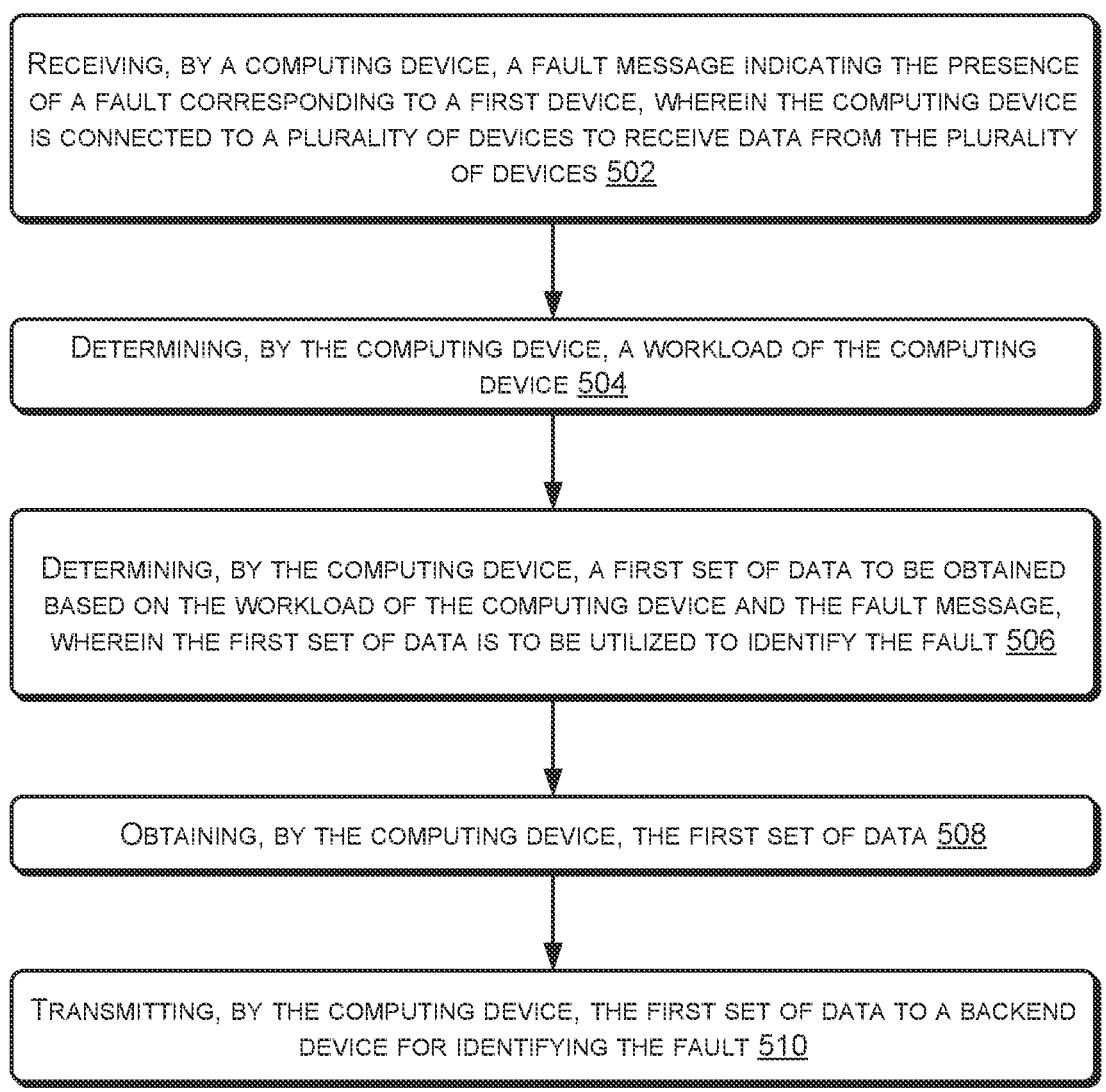
FIG. 5 illustrates a method for obtaining data for identifying a fault, according to an example implementation of the present subject matter.

FIG. 5 illustrates a method 500 for obtaining data for identifying a fault, according to an example implementation of the present subject matter. The order in which the method 500 is described is not intended to be construed as a limitation, and any number of the described method blocks may be combined in any order to implement the method 500, or alternative methods. Furthermore, the method 500 may be implemented by processing resource(s) or computing device(s) through any suitable hardware, non-transitory machine-readable instructions, or a combination thereof.

It may be understood that blocks of the method 500 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 500 may be performed by a computing device, such as the management device 100. Although the method 500 may be implemented in a variety of systems, the method 500 is described in relation to the management device 100, for ease of explanation.

At block 502, a fault message indicating the presence of a fault corresponding to a first device is received by a computing device. The computing device may be connected to a plurality of devices to receive data from the plurality of devices. The computing device may be the management device 100 or the second management device 404. Further, the plurality of devices may include another management device, such as the first management device 402, and managed devices, such as the managed devices 202. In an example, the managed devices may be part of a data center and may include a server, a network switch, a server enclosure, a power distribution unit (PDU), or any combination thereof, as explained above.

In an example, the first device may be the other management device. As explained above, the other management device may be in an active-standby relationship with the computing device, and the fault message may indicate a failure of the other management device. In another example, the first device may be a managed device.

In response to the receipt of the fault message, at block 404, a workload of the computing device is computed. The workload may be computed based on the number of pending tasks to be performed by the computing device, as explained with reference to FIG. 2.

At block 506, a first set of data to be obtained is determined. The determination may be based on the workload of the computing device and the fault message. The first set of data may have to be utilized to identify the fault. In an example, determining the first set of data to be obtained based on the workload includes determining a length of a time window in the past for which data is to be obtained based on the workload. Higher the workload, lower may be the length of the time window. For instance, for a low workload of the computing device, log messages generated in the past six hours may have to be obtained, and for a high workload of the computing device, log messages generated in the past one hour may have to be obtained, as explained above. In another example, determining the first set of data to be obtained based on the workload includes determining a severity category of messages that are to be obtained based on the workload. For instance, for a low workload of the computing device, log messages of error category, warning category, and information category may have to be obtained, and for a medium workload of the computing device, log messages of error category and warning category alone may have to be obtained. In a further example, both the severity category of messages to be obtained and the length of time window may be determined based on the workload.

At block 508, the first set of data may be obtained. In an example, the first set of data is to be obtained from the first device, a second device that is connected to the first device, a storage accessible to the computing device, or any combination thereof, as explained with reference to FIG. 2. The storage may be, for example, a storage that is part of the computing device or a storage that is connected to the computing device, such as the storage 210.

At block 510, the first set of data is transmitted to a backend device for identifying the fault. The backend device may be, for example, the backend device 212.

In an example, the method 500 includes determining that the workload of the computing device is less than a threshold workload. In response to the determination, inventory data may be obtained from the first device. The inventory data may include details of applications, firmware, hardware, OS, and the like that are part of the first device, such as firmware version, OS version, size of disk, size of memory, validity of license of an application. The inventory data may be helpful to identify the fault or predict a fault corresponding to the first device.

Figure 6:
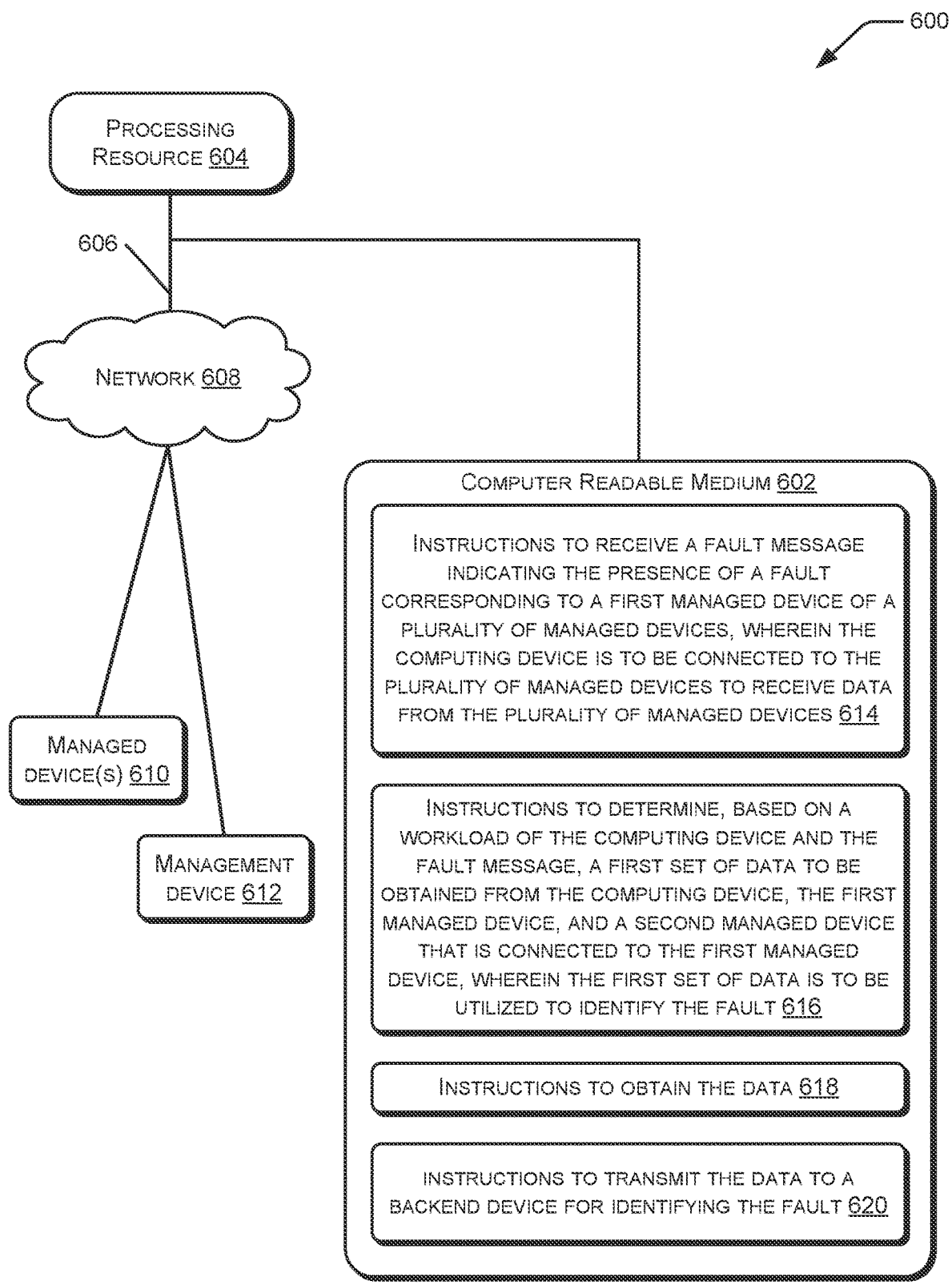
FIG. 6 illustrates a computing environment implementing a non-transitory computer-readable medium for obtaining data for fault identification, according to an example implementation of the present subject matter.

FIG. 6 illustrates a computing environment 600 implementing a non-transitory computer-readable medium for obtaining data for fault identification, according to an example implementation of the present subject matter. In an example, the non-transitory computer-readable medium 602 may be utilized by a computing device, such as the management device 100 or the second management device 404. In an example, the computing environment 600 may include a processing resource 604 communicatively coupled to the non-transitory computer-readable medium 602 through a communication link 606. The processing resource 604 may be, for example, the processor 102.

The non-transitory computer-readable medium 602 may be, for example, an internal memory device or an external memory device. In an example, the communication link 606 may be a direct communication link, such as any memory read/write interface. In another example, the communication link 606 may be an indirect communication link, such as a network interface. In such a case, the processing resource 604 may access the non-transitory computer-readable medium 602 through a network 608. The network 608 may be a single network or a combination of multiple networks and may use a variety of different communication protocols.

The processing resource 604 and the non-transitory computer-readable medium 602 may also be communicatively coupled to managed device(s) 610, such as the managed devices 202, and a management device 612, such as the first management device 402.

In an example implementation, the non-transitory computer-readable medium 602 includes a set of computer-readable instructions for obtaining data for fault identification. The set of computer-readable instructions can be accessed by the processing resource 604 through the communication link 606 and subsequently executed.

Referring to FIG. 6, in an example, the non-transitory computer-readable medium 602 includes instructions 614 that cause the processing resource 604 of a computing device to receive a fault message indicating the presence of a fault corresponding to a first managed device of a plurality of managed devices, such as the managed device(s) 610. The computing device is to be connected to the managed devices to receive data from the managed devices. The first managed device may be, for example, the first managed device 204.

The non-transitory computer-readable medium 602 includes instructions 616 to determine, based on a workload of the computing device and the fault message, a first set of data to be obtained from the computing device, the first managed device, and a second managed device that is connected to the first managed device. The first set of data is to be utilized to identify the fault. The second managed device may be, for example, the second managed device 206. In an example, to determine the first set of data based on the fault message, the instructions are executable by the processing resource to utilize a lookup table. The lookup table may indicate a set of data to be obtained for each of a plurality of fault messages. Further, in an example, to determine the first set of data based on the workload, the lookup table may indicate a set of data to be obtained for each of a plurality of workload levels, such as a high workload level, a medium workload level, and a low workload level, as explained above.

In an example, the instructions are executable by the processing resource to determine the workload of the computing device based on a number of pending tasks that are to be performed by the computing device and based on workload of a hardware component of the computing device. Each pending task may pertain to a managed device of the plurality of managed devices, as explained with reference to FIG. 2.

The non-transitory computer-readable medium 602 includes instructions 618 to obtain the first set of data. The non-transitory computer-readable medium 602 includes instructions 620 to transmit the first set of data to a backend device, such as the backend device 212, for identifying the fault. In an example, upon transmitting the first set of data, the instructions may be executable by the processing resource to obtain a second set of data for identifying the fault in response to an indication that the first set of data is insufficient to identify the fault.

The present subject matter provides reliable techniques for obtaining data by preventing overloading and crashing of a management device. Further, relevant data is obtained for identification of faults. By collecting data from devices that are connected to a managed device indicated by the fault message, a holistic view regarding the fault may be obtained and a quicker identification of the fault may be achieved.

Although implementations of obtaining data for fault identification have been described in language specific to structural features and/or methods, it is to be understood that the present subject matter is not necessarily limited to the specific features or methods described. Rather, the specific features and methods are disclosed and explained as example implementations.

We claim:

1. A computing device comprising:
   a processor; and
   a memory comprising instructions executable by the processor to:
   receive a fault message indicating the presence of a fault corresponding to a first device, wherein the computing device is connected to a plurality of devices to receive data from the plurality of devices;
   determine, based on a workload of the computing device and the fault message, a first set of data to be obtained, wherein the first set of data is to be utilized to identify the fault; and
   obtain the first set of data for identifying the fault.

2. The computing device of claim 1, wherein the first set of data is to be obtained from one or more of: the first device and a second device that is connected to the first device, the second device being part of the plurality of devices.

3. The computing device of claim 2, wherein, to determine that data is to be obtained from the second device in response to the fault message, the instructions are executable to utilize a topology graph indicating a connection between the first device and the second device.

4. The computing device of claim 1, wherein the first set of data is to be obtained from one or more of: a storage of the computing device in which logs generated in the computing device are to be stored and a storage accessible to the computing device in which data received from a device is to be stored.

5. The computing device of claim 1, wherein the first set of data comprises one or more of: network logs of the first device, information of utilization of hardware components of the first device, application logs of an application of the computing device that is to perform control functions on the first device, and operating system logs of the computing device.

6. The computing device of claim 1, wherein the instructions are executable by the processor to determine the workload of the computing device based on pending tasks that are to be performed by the computing device, wherein each pending task pertains to a device of the plurality of devices.

7. The computing device of claim 1, wherein the first set of data to be obtained is less for a first workload of the computing device than for a second workload that is more than the first workload.

8. The computing device of claim 1, wherein, to determine the first set of data to be obtained based on the fault message, the instructions are executable to utilize a lookup table indicating a set of data to be obtained for each of a plurality of fault messages.

9. The computing device of claim 1, wherein the instructions are executable to:
   transmit the first set of data to a backend device for identification of the fault;

receive an indication from the backend device that the first set of data is insufficient to identify the fault;

in response to the indication, determine, based on workload of the computing device, a second set of data to be obtained; and obtain the second set of data.

10. A method comprising:

receiving, by a computing device, a fault message indicating the presence of a fault corresponding to a first device, wherein the computing device is connected to a plurality of devices to receive data from the plurality of devices;

determining, by the computing device, a workload of the computing device;

determining, by the computing device, a first set of data to be obtained based on the workload of the computing device and the fault message, wherein the first set of data is to be utilized to identify the fault;

obtaining, by the computing device, the first set of data; and transmitting, by the computing device, the first set of data to a backend device for identifying the fault.

11. The method of claim 10, wherein the first set of data is to be obtained from one or more of: the first device, a second device that is connected to the first device, and a storage accessible to the computing device.

12. The method of claim 10, wherein the computing device and the first device are to be in an active-standby relationship and wherein the fault message indicates a failure of the first device.

13. The method of claim 10, wherein determining the first set of data to be obtained based on the workload of the computing device comprises one or more of: determining a length of a time window in the past for which data is to be obtained based on the workload and determining a severity category of messages that are to be obtained based on the workload.

14. The method of claim 10, wherein the plurality of devices comprises devices that are part of a data center, wherein the devices that are part of the data center comprises one or more of: a server, a network switch, a server enclosure, and a power distribution unit.

15. The method of claim 10, comprising:

determining that the workload of the computing device is less than a threshold workload; and in response to the determination, obtaining inventory data from the first device.

16. A non-transitory computer-readable medium comprising instructions, the instructions being executable by a processing resource of a computing device to:

receive a fault message indicating the presence of a fault corresponding to a first managed device of a plurality of managed devices, wherein the computing device is to be connected to the plurality of managed devices to receive data from the plurality of managed devices;

determine, based on a workload of the computing device and the fault message, a first set of data to be obtained from the computing device, the first managed device, and a second managed device that is connected to the first managed device, wherein the first set of data is to be utilized to identify the fault;

obtain the first set of data; and transmit the first set of data to a backend device for identifying the fault.

17. The non-transitory computer-readable medium of claim 16, wherein, to determine the first set of data based on the fault message, the instructions are executable by the processing resource to utilize a lookup table indicating a set of data to be obtained for each of a plurality of fault messages.

18. The non-transitory computer-readable medium of claim 17, wherein, to determine the first set of data based on the workload, the lookup table is to indicate a set of data to be obtained for each of a plurality of workload levels.

19. The non-transitory computer-readable medium of claim 16, wherein the instructions are executable by the processing resource to determine the workload of the computing device based on a number of pending tasks that are to be performed by the computing device and based on workload of a hardware component of the computing device, wherein each pending task pertains to a managed device of the plurality of managed devices.

20. The non-transitory computer-readable medium of claim 16, wherein, subsequent to transmitting the first set of data, the instructions are executable by the processing resource to obtain a second set of data for identifying the fault in response to an indication that the first set of data is insufficient to identify the fault.

* * * * *